Aug. 25, 1964     G. B. OLLINGER     3,145,533
JET-THRUST INTERNAL COMBUSTION ENGINE
Filed July 13, 1962     3 Sheets-Sheet 1
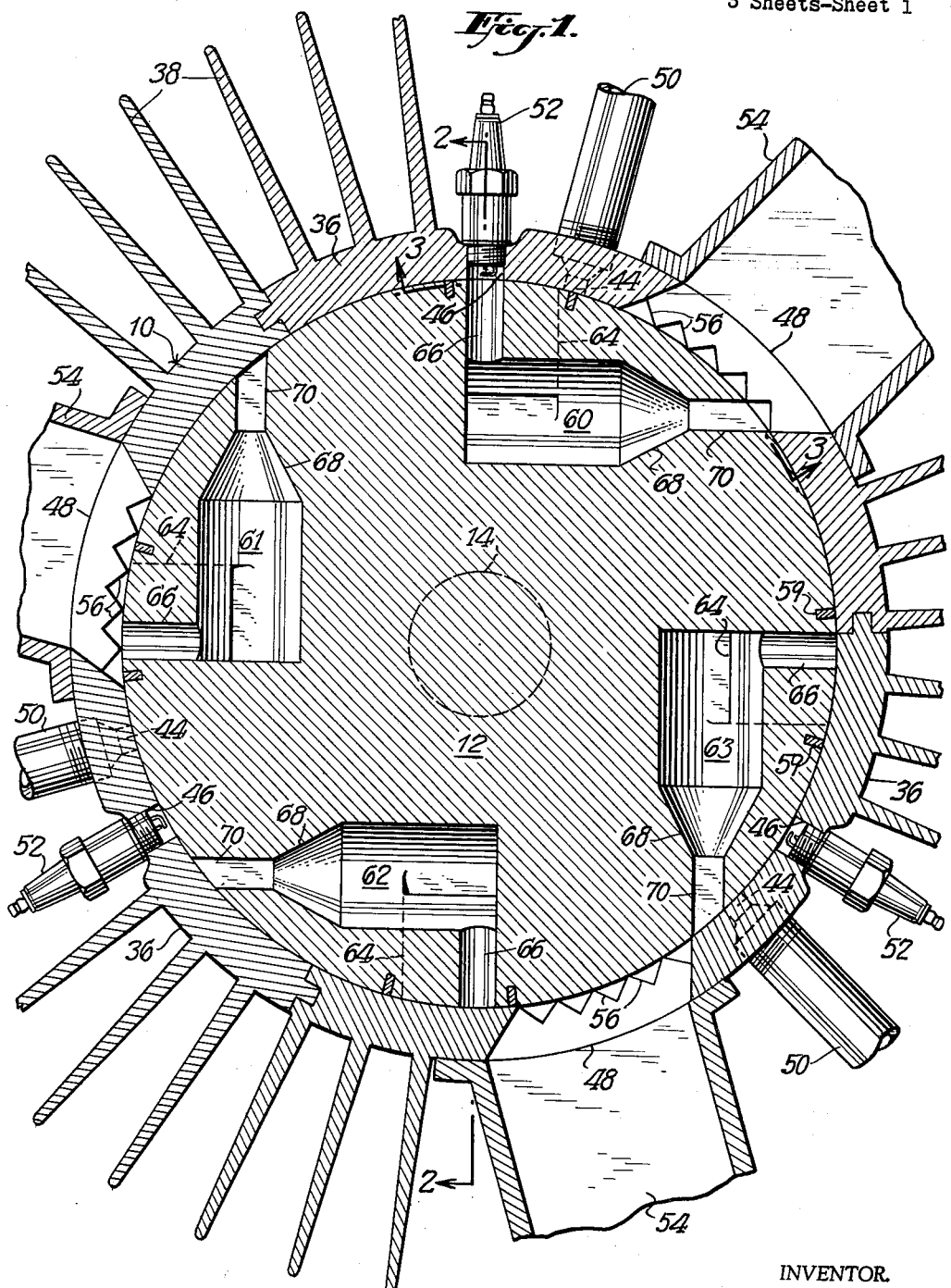
INVENTOR.
GEORGE BATCHELDER OLLINGER.
BY
*Ward, Neal, Haselton, Orme & McElhannon*
ATTORNEYS.

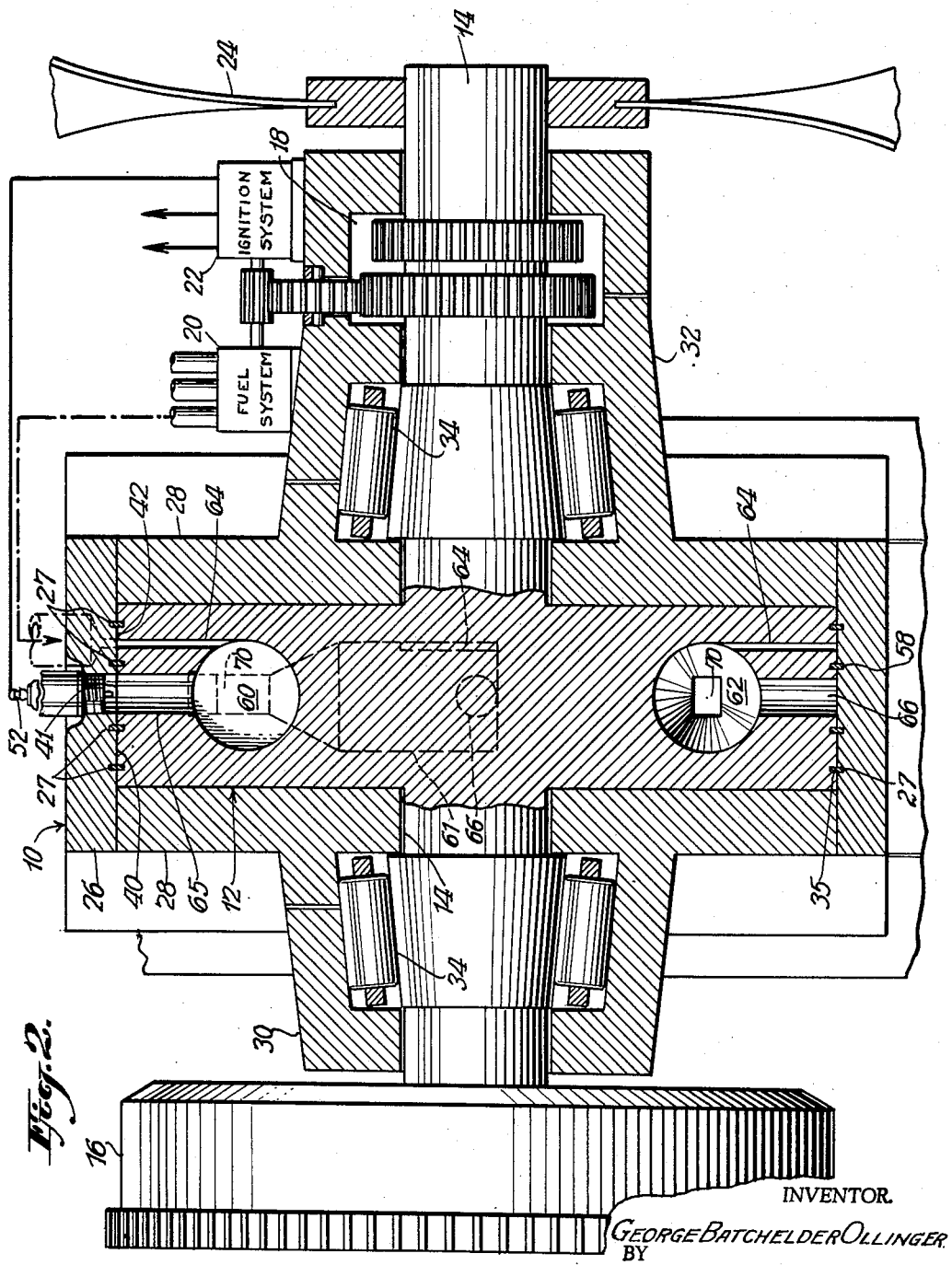

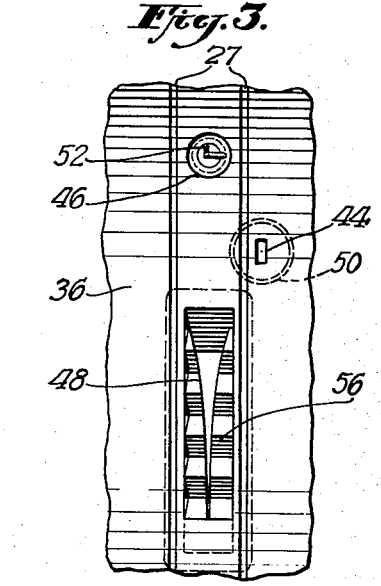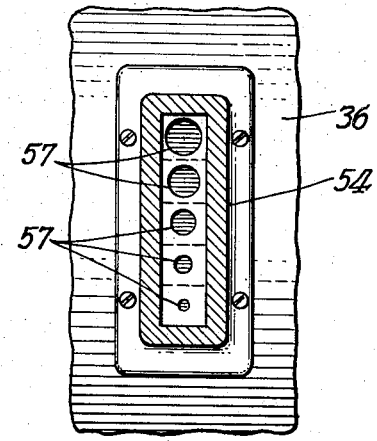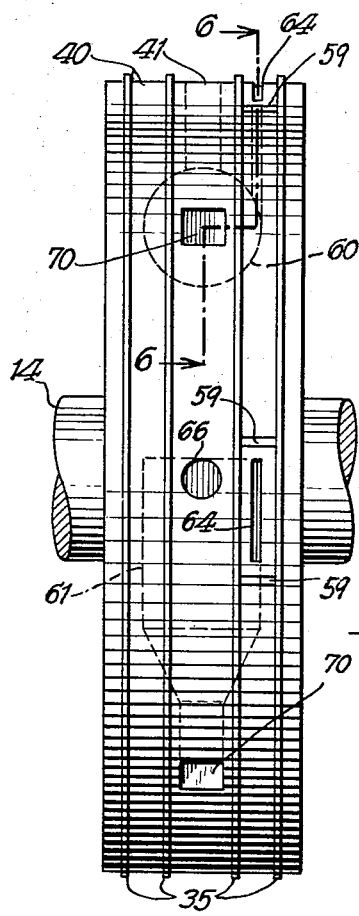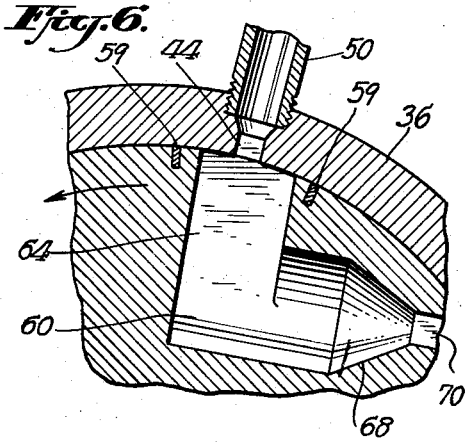

United States Patent Office 3,145,533
Patented Aug. 25, 1964

3,145,533
JET-THRUST INTERNAL COMBUSTION ENGINE
George Batchelder Ollinger, 93 Shore Road,
Old Greenwich, Conn.
Filed July 13, 1962, Ser. No. 209,566
4 Claims. (Cl. 60—39.34)

This invention relates to prime movers and more particularly it concerns an improved rotary type internal combustion engine.

Rotary engines, as distinguished from the more conventional reciprocating type engines, operate on the principle of the direct action or reaction of expanding gases upon a rotary element in a manner which causes it to turn. A major advantage of rotary engines over reciprocating type engines accrues from their inherent structural simplicity, whereby the noise, wear and complexity caused by the various moving parts of reciprocating engines, such as reciprocating valves, pistons, rocker arms, etc., are eliminated. A well known type of rotary engine is the gas turbine, but gas turbines, in their present state of development are incapable of producing useful output power except at extremely high speeds. This results in limited application as well as unusually severe design restrictions. A further disadvantage of the gas turbine is the difficulty with which its speed may be controlled.

The rotary engine of my invention comprises a stator having an enclosed compartment within which a cylindrically shaped rotor structure may turn. The rotor structure includes a number of combustion chambers each having an exhaust nozzle directed toward the rotor periphery at an angle such that exhaust gases from the nozzle develop a rotation producing, thrust component. The combustion chambers are charged with a controllable combustible gas which is ignited intermittently to provide power and control at low engine speeds.

The inner peripheral surface of the stator compartment includes thrust reaction surfaces which extend over periodically situated or spaced sectors, and against which the combustion chamber exhaust nozzles are directed. These reaction surfaces gradually give way to exhaust ports which extend from the inner compartment to the outer surface of the stator in the vicinity of each of the reaction surfaces.

Means are provided to inject fuel into each combustion chamber and to ignite the fuel at the instant its respective exhaust nozzle is directed against one of the periodically disposed reaction surfaces. At ignition, the initial burning of the gases in the combustion chamber causes a pressure transient which propagates through the nozzle and against the reaction surfaces of the stator to induce rotation of the rotor element. As rotation continues and the gases in the combustion chamber become entirely burned, they are permitted escape in increasing quantity through the variable opening to the exhaust port. This results in a jet-type thrust in the rotor which enhances the initial reaction effect. A gradual transition from the initial force reaction effect to the subsequent jet-type thrust effect is thus produced which leads to a smooth and efficient utilization of available power. A further advantage of the gradually increased stator exhaust port size will be seen in improved "scavenging" characteristics whereby the burnt gases are more completely removed from the combustion chamber following each firing.

It is one object of the invention to provide an internal combustion engine which does not have the disadvantages of a reciprocating combustion engine and which is simple to construct and operate.

It is a further object of the invention to provide a rotary engine which will provide substantial amounts of controllable power at low as well as high speeds and which has other advantages as compared to known types of rotary engines.

Further objects, features and advantages of the invention will appear from the following detailed description given below, taken in connection with the accompanying drawings which form a part of this specification and which illustrate by way of example, a preferred embodiment of the invention.

In the drawings:

FIG. 1 is a side section view partly in schematic of the principal parts of the preferred embodiment of the present invention;

FIG. 2 is a view taken along lines 2—2 of FIG. 1;

FIG. 3 is a view taken along lines 3—3 of FIG. 1;

FIG. 4 is an alternate arrangement of the portion of the apparatus shown in FIG. 3;

FIG. 5 is a side view of one of the elements of the preferred embodiment; and

FIG. 6 is a section taken along lines 6—6 of FIG. 5.

In FIGS. 1 and 2, the preferred embodiment of a rotary engine of the invention is shown to comprise a stator assembly 10, and a rotor structure 12, mounted on a central shaft 14, and supported for rotation within the stator assembly 10. A flywheel 16, which also serves as an output coupling means, is provided at one end of the central shaft 14 for coupling output power from the device to a utilization means (not shown). At the opposite end of a central shaft 14, a system of gears 18 is provided to drive a conventional fuel-air injection system 20 and a conventional ignition system 22 in synchronization with the rotation of the central shaft 14. A fan 24 is also provided at the same end of the central shaft for cooling purposes.

The stator assembly 10 comprises an outer ring 26 which is supported by circular end plates 28. Bearing caps 30 and 32 are fastened in any well-known manner to the outer sides of the end plates 28 and serve as races for tapered roller bearings 34 which support the central shaft 14 and the rotor structure 12 for rotation within the stator assembly 10. The outer ring 26 preferably comprises a number of mutually interlocked arc shaped segments 36 (FIG. 2). Integral with these arc shaped segments 36 are cooling fins 38 which extend radially from the stator assembly and function to radiate excess heat developed during operation of the device. The inner surface of the outer ring 26 is interrupted by continuous, inner periphery grooves 27 which divide the inner surface into first, second and third peripheral sections extending axially within the ring. These sections are designated respectively as 40, 41 and 42. The grooves 27 receive sealing rings 35 extending from or received in corresponding grooves in the rotor structure 12. As will be seen below, this provides an isolation means effective to prevent gases from leaking axially between the various peripheral sections.

Spaced at various locations about the outer ring 26 are groups of openings or ports which extend between the inner and outer surfaces of the stator assembly. Each group includes a fuel-air injection port 44, an ignition port 46, and a graduated exhaust port 48. The relationship between the various ports in each group is shown in FIG. 3. It will be noted that both the ignition and the graduated exhaust ports 46 and 48, open into the second peripheral section 41, while the port 44, opens into the third peripheral section 42. The outermost portion of the injection port is shaped to receive an input line 50 from the fuel system 20. The innermost portion of the port, which opens into the inner surface of the outer ring 26, however, is of a substantially rectangular shape for communicating with corresponding intake channels in the rotor structure. The ignition port 46, in each group, is substantially cylindrical in shape and is constructed to receive some ignition means such as a spark plug 52. The spark plug is connected to the ignition system 22 in conventional manner and cooperates with the ignition system to produce an electrical spark at the proper intervals. The graduated exhaust port 48 occupies a substantial rotational sector in the second peripheral section of the outer ring 26. It will be noted from FIG. 3, that the exhaust port opening is extremely narrow at one end of the sector and gradually increases in width until it occupies nearly the full width of the peripheral section at the opposite end of the sector. An exhaust pipe 54 is provided at the outside surface of the outer ring 26, in the vicinity of the sector occupied by the exhaust port, and serves to convey expended gases away from the system.

Referring again to FIG. 2, it will be noted that in the vicinity of the graduated exhaust port 48, the inner surface of the outer ring 26 is cut to form a number of steps or stages 56. These steps serve as reaction surfaces against which pressure transients from expanding and burning gases within the rotor react to produce rotation of the rotor. It will also be noted from FIG. 3 that these steps or stages occupy nearly the full width of the second peripheral section 41, in the same rotational sector occupied by the graduated exhaust port 48. It can be seen that, in going from one end of this sector to the other, the area occupied by the staged reaction surfaces gradually gives way to the area occupied by the exhaust nozzle 70 of the rotor.

A modification of the exhaust port-reaction surface configuration of FIG. 3 is shown in FIG. 4. In this version, the continuous exhaust port is replaced by a series of circular holes 57 of successively increasing diameter, each hole occupying a different stage of the reaction surfaces. This embodiment likewise is effective to produce a gradual transition from the area occupied by the thrust reaction surfaces to the area occupied by the exhaust nozzle 70. Furthermore, by providing a series of circular openings, as in FIG. 4, fabrication and machining costs are considerably reduced.

The rotor structure 12 is shown most clearly in FIGS. 2 and 5. In FIG. 2, the rotor structure is shown to be essentially cylindrical in shape and to fit closely within the stator assembly 10. As can be seen from FIG. 5, the rotor structure includes a number of circular sealing rings 35 on its outer cylindrical surface which divide the surface into various peripheral sections coinciding with the first, second and third circular sections of the outer ring 26. In assembly, the circular rings on the rotor structure fit into the circular grooves 27 on the inner surface of the outer ring 26, and serve as sealing means which isolate each peripheral section from gases and pressures in adjacent sections. The rings 35 may be integral with the rotor structure 12 or the rotor structure itself may be grooved with the rings 35 fitting into such grooves.

Within the rotor structure 12 are located a number of cylindrically shaped combustion chambers 60–63. Intake and ignition channels, designated respectively as 64 and 66, extend from one end of each combustion chamber in a radial direction to the outer cylindrical surface of the rotor structure. At the opposite end of each combustion chamber is a tapered transition section 68 which communicates with an exhaust nozzle 70. The exhaust nozzle 70 opens onto the outer cylindrical surface of the rotor structure. Both the ignition channel 66 and the exhaust nozzle 70 open into the second peripheral section 41 defined by the circular rings 35, and communicate with corresponding ports in the outer ring 26 when the rotor structure is in proper angular relationship with the stator assembly 10. The intake channel 64, on the other hand, opens into the third peripheral section 42 and communicates with the various intake ports 44 in the outer ring 26. Each combustion chamber ignition channel 66 is of approximately the same cross-sectional size and shape as the ignition ports 46 in the outer ring 26. Thus during operation of the device an ignition channel 66 in the rotor structure coincides in position with a corresponding ignition port 46 in the stator assembly only for the instant required to fire the spark plug 52. It will be appreciated that during the resultant combustion process, and shortly after ignition of the gas, the spark plug 52 becomes effectively sealed off from the combustion chamber as the rotor turns and consequently is protected from corrosion and burning.

Referring now to FIG. 6, it can be seen that the length of the intake channel 64 in each combustion chamber, occupies a substantially greater rotational sector than do the corresponding injection ports 44 in the stator assembly. Because of this, the fuel intake process, which occurs whenever an intake port in the stator opens into an intake channel in the rotor, continues for a predetermined time in order to permit a sufficient quantity of fuel and air to enter the combustion chamber at each cycle of operation. In order further to insure the proper isolation of the intake ports and channels, additional transverse seals 59 are provided in the third circular section 42 of the rotor structure at both sides of the intake channel 64.

The exhaust nozzle openings 70 will be seen to occupy nearly the entire width of the second peripheral section 41 in the rotor structure 12. Its peripheral dimension, however, is much less than the sector occupied by the exhaust port 48, and is preferably equivalent to one of the stages of the thrust reaction surfaces in the outer ring 26. Thus, the exhaust nozzle opening 70 of each combustion chamber is closed by the inner surface of the outer ring 26, except when it becomes incident upon the sector occupied by one of the exhaust ports 48. At the beginning of the sector the effective nozzle area is at a minimum due to the narrow opening of the exhaust port 48. As the nozzle opening 70 moves toward the other end of the sector, however, its effective area increases until at the other end of the sector it achieves maximum size.

In operation of the preferred embodiment illustrated, the rotor structure 12 turns in a counter-clockwise direction (as viewed in FIG. 2) within the stator assembly 10. The tolerances between the rotor structure and the outer ring 26 of the stator assembly are such that as the various channels in the rotor structure pass under corresponding ports in the outer ring, a valving action is produced. The relative spacing of each group of ports and channels is such that as the rotor turns, this valving action occurs in proper sequence to provide intake, ignition, thrust and exhaust in each combustion chamber. As the rotor structure turns, the intake channel 64 on one of the combustion chambers, such as the chamber 60, first communicates with the injection port 44 in one of the groups in the stator assembly 10 and supplies a combustible mixture to the chamber. Because of the elongated shape of the intake channel, the explosive mixture continues to enter the combustion chamber for a time sufficient to achieve a desired charge. When the combustion chamber intake channel 64 passes beyond the stator injection port 44, the channel 64 becomes sealed and the ignition channel to the combustion chamber becomes coincident with the spark plug 52 in the stator ignition port 46. At the same time, the exhaust nozzle becomes coincident upon the first stage of the thrust reaction surface 56. The spark plug 52 fires at this instant and ignites the explosive mixture at one end of the combustion chamber 60. This produces an initial pressure transient which propagates through the combustion chamber and out the nozzle 70. The pressure transient tends to force the combustion chamber gases out through the nozzle and against the first stage of the reaction surface 56 in the outer ring 26, thereby causing the rotor 12 to turn in a counterclockwise direction. Although the initial pressure transient tends to expel unburned and as yet unexpanded gases from the combustion chamber, the reduced size of the exhaust port in this region prevents loss of these gases before their useful potential is realized. As the rotor continues to turn, the gases in the combustion chamber become completely burned causing pressure within the chamber to build up and become more uniform. The turning of the rotor 12 also brings the exhaust nozzle into communication with an increased exhaust port opening thus effectively increasing the exhaust area of the nozzle. This permits the now expanded gases to exhaust from the combustion chamber at high velocity, thus producing a jet-type thrust reaction which is effective to augment the initial pressure transient in driving the rotor. The gradual blending of the pressure type reaction effect and the jet-type thrust effect, by means of the graduated exhaust port in conjunction with the reaction surfaces, provides a smooth and efficient power stroke in each operating cycle. When the rotor 12 has turned sufficiently to bring the exhaust nozzle into communication with the last stage of the thrust reaction surface 56, a maximum exhaust opening is presented. This permits effective "scavenging" or removal of burned gases from the combustion chamber 60 into the exhaust manifold 54 and hence into the atmosphere. This in turn ensures that a proper explosive charge will be forced into the combustion chamber during the next subsequent operating cycle.

Referring again to FIG. 1, it will be seen that the stator assembly 10 includes three groups of ports 44, 46, and 48 while the rotor structure 12 includes four combustion chambers 60–63 with corresponding sets of channels 64 and 66. Each combustion chamber is thus subjected to three complete operating cycles in every revolution of the rotor structure 12, for a combined total of twelve power strokes per revolution. The number of available power strokes may easily be increased or decreased by changing either the number of combustion chambers or the number of groups of stator assembly ports. Furthermore, since the stator assembly ports all extend in a radial direction toward the rotor structure, the engine is amenable to the axial stacking of additional rotor structures 12 on the same central shaft 14 with corresponding stator assemblies 10. This permits a substantial increase in power at a minimum weight increase.

Speed is controlled in the present device simply by controlling the quantity of fuel and air supplied to the combustion chambers.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. A rotary engine comprising a hollow cylindrical stator having groups of ports extending from the interior to the exterior thereof, said groups each comprising an exhaust port, an intake port and an ignition port, the exhaust and the ignition ports all lying in a first common plane, the intake ports lying in a second plane parallel to but axially displaced from said common plane, the size of the opening of each exhaust port increasing in a given circumferential direction, a cylindrical rotor mounted for rotation in said given direction within the interior of said cylindrical stator, said rotor having therein a plurality of circumferentially spaced and aligned combustion chambers, each of said combustion chambers being formed with an exhaust nozzle and an ignition channel which open peripherally of said rotor in said first common plane, the exhaust nozzle and ignition channel openings of each combustion chamber being mutually displaced by an amount equal to the displacement between the exhaust and ignition ports of each group in said stator, each of said combustion chambers being further formed with an intake channel which opens peripherally of said rotor in said second plane, circumferential pressure sealing means between said rotor and said stator between and on either side of said first and second planes, further sealing means extending axially of said rotor and disposed on circumferentially opposite sides of each of said intake openings and between said rotor and said stator for providing gas type isolation of said intake openings, fuel injection means controlled by said rotor and connected to said intake ports for injecting a combustible mixture into a combustion chamber having its intake opening aligned with an intake port, and ignition means controlled by said rotor and connected to said ignition ports for igniting the combustible mixture in a chamber having its ignition opening aligned with an intake port in its nozzle opening aligned with an exhaust port.

2. A rotary engine comprising a hollow cylindrical stator formed by a plurality of similar circular sections connected together, each said sections having an exhaust port, an intake port and an ignition port extending radially therethrough and circumferentially spaced from each other, the exhaust and ignition ports all lying in a first common plane, the intake ports lying in a second plane parallel to but axially displaced from said common plane, the size of the opening of each exhaust port increasing incrementally in a given circumferential direction, a cylindrical rotor mounted for rotation in said given direction within the interior of the assembled cylindrical stator, said rotor having therein a plurality of circumferentially spaced and aligned combustion chambers, each of said combustion chambers being formed with an exhaust nozzle and an ignition channel which open peripherally of said rotor in said first common plane, the exhaust nozzle and ignition channel openings of each combustion chamber being mutually displaced by an amount equal to the displacement between the exhaust and ignition ports of each group in said stator, each of said combustion chambers being further formed with an intake channel which opens peripherally of said rotor in said second plane, said rotor being formed with peripheral ridges extending circumferentially thereabout between and on either side of said planes, said peripheral ridges extending into corresponding slots in said stator for providing pressure tight sealing between said planes while permitting rotation of said rotor member within said stator, sealing means extending axially of said rotor and disposed on circumferentially opposite sides of said intake openings and between said rotor and said stator for maintaining gas tight seal between said rotor and said stator and for providing gas tight isolation of said intake openings, fuel injection means controlled by said rotor and connected to said intake ports for injecting combustible mixture into a combustion chamber having its intake opening aligned with an intake port, and ignition means controlled by said rotor and connected to said ignition ports for igniting the combustible mixture in a chamber having its ignition opening aligned with an intake port and its nozzle opening aligned with an exhaust port.

3. A rotary engine comprising a hollow cylindrical stator having a plurality of groups of ports extending from the interior to the exterior thereof, each of said groups comprising an exhaust port, an intake port and an ignition port circumferentially spaced from each other in a predetermined direction and in the order named, the size of the opening of said exhaust port increasing in said direction and means connecting said exhaust port with the atmosphere; a cylindrical rotor mounted for rotation in said direction within said stator in gastight relation therewith; said rotor having a plurality of circumferentially spaced and aligned combustion chambers therein spaced from the axis of rotation of said rotor and having means forming nozzles, one for each chamber, in gas communication with said chambers for directing gas outwardly of the periphery of said rotor and oppositely of said direction, each of said nozzles having an exhauset opening at the periphery of said rotor which, upon rotation of said rotor, becomes aligned with successive exhaust ports of said stator; said rotor having intake openings therein, one for each of said chambers, said intake openings leading from the periphery of said rotor to said chambers, which intake openings, upon rotation of said rotor, become aligned with successive intake ports of said stator, and said rotor having ignition openings therein leading from the periphery of said rotor to said chambers, which ignition openings, upon rotation of said rotor (become aligned with successive ignition ports of said stator, said ignition and nozzle openings being spaced apart circumferentially substantially the same distance as the spacing between adjacent said ignition and exhaust ports; fuel injection means controlled by said rotor and connected to said intake ports for injecting a combustible mixture into a combustion chamber having its intake opening aligned with an intake port; and ignition means controlled by said rotor and connected to said ignition ports for igniting the combustible mixture in a chamber having its ignition opening aligned with an intake port and its nozzle opening aligned with an exhaust port.

4. A rotary engine comprising a hollow cylindrical stator formed by a plurality of similar circular sections connected together, each of said sections having an exhaust port, an intake port and an ignition port extending radially therethrough and circumferentially spaced from each other in a predetermined direction and in the order named, the size of the opening of said exhaust port increasing in said direction and means connecting said exhaust port with the atmosphere; a cylindrical rotor mounted for rotation in said direction within said stator, said rotor having a plurality of circumferentially spaced and aligned combustion chambers therein spaced from the axis of rotation of said rotor and having means forming nozzles, one for each chamber, in gas communication with said chambers for directing gas outwardly of the periphery of said rotor and oppositely of said direction, each of said nozzles having an exhaust opening at the periphery of said rotor and each opening having a rotational path co-incident with the exhaust ports of said stator; said rotor having intake openings therein, one for each of said chambers, said intake openings leading from the periphery of said rotor to said chambers and having rotational paths co-incident with the intake ports of said stator, said intake ports being spaced axially of said stator from said ignition and exhaust ports and said rotor having ignition openings therein, one for each said chamber, leading from the periphery of said rotor to said chambers and having rotational paths co-incident with the ignition ports of said stator, said ignition and nozzle openings being spaced apart circumferentially substantially the same distance as the spacing between adjacent said ignition and exhaust ports; sealing means extending circumferentially of said rotor and disposed between said rotor and said stator and on axially opposite sides of said openings in said rotor for maintaining a gastight seal between said rotor and said stator and between said intake openings and said ignition and nozzle openings; sealing means extending axially of said rotor and disposed on circumferentially opposite sides of each of said intake openings and between said rotor and said stator for maintaining a gastight seal between said rotor and said stator and for providing gastight isolation of said intake openings; fuel injection means controlled by said rotor and connected to said intake ports for injecting a combustible mixture into a combustion chamber having its intake opening aligned with an intake port; and ignition means controlled by said rotor and connected to said ignition ports for igniting the combustible mixture in a chamber having its ignition opening aligned with an intake port and its nozzle opening aligned with an exhaust port.

References Cited in the file of this patent
UNITED STATES PATENTS

| | | |
|---|---|---|
| 1,291,273 | Tyler | Jan. 14, 1919 |
| 2,504,854 | Longfellow | Apr. 18, 1950 |
| 2,595,999 | Way et al. | May 6, 1952 |
| 2,680,949 | Butler | June 15, 1954 |
| 3,089,307 | Kollander | May 14, 1963 |